Patented Feb. 25, 1936

2,031,898

UNITED STATES PATENT OFFICE 2,031,898

METHOD OF DECOLORIZING GYPSUM

Frank Lee Marsh, Medicine Lodge, Kans., assignor to The Best Brothers Keene's Cement Company, Medicine Lodge, Kans., a corporation of Kansas No Drawing. Application September 18, 1933, Serial No. 689,958

8 Claims. (Cl. 106—34)

My invention relates to a method of decolorizing gypsum in its various forms, and more particularly to treatment of gypsum rock for removal of impurities of organic or other nature and resultant production of a substantially chemically pure and clear white plaster, cement or other calcium sulphate product.

Impurities most commonly found in gypsum, in its natural state, are in the form of lime, either as calcium carbonate or magnesium carbonate, which will react with sulphuric acid to liberate carbon dioxide gas and form a sulphate, and as impurities in the rock largely pass off in the form of gas, it is unnecessary to remove them by filtration, precipitation, magnetic separation or otherwise, residue left from the acid treatment being a pure sulphate.

It is, therefore, the object of my invention to provide a method of purifying and decolorizing gypsum products by treatment of the gypsum rock with a reagent, such as sulphuric acid, capable of driving off the impurities from the rock and leaving the resultant product, after subsequent calcination, substantially chemically pure and of clear white color.

In practicing my method I preferably grind the rock and then treat the ground rock in wet form with an amount of sulphuric acid necessary to satisfy any compounds present in the rock that will react with the acid to form a sulphate, it having been found that approximately one percent, by weight, of acid will be sufficient to react with each three-fourths of one percent of carbonate, and that the treatment can be more rapidly and thoroughly accomplished the finer the rock is divided.

To secure the full benefit of the method, the material should be calcined after it has been treated with the acid so that the organic matter present in the gypsum, which has been changed by the sulphuric acid, and any excess sulphuric acid left from this treatment, may be driven off by subsequent calcination; temperature of calcination being regulated according to the ultimate product desired, the calcination at higher temperatures producing a product of better color than those calcined at lower temperatures, probably because all of the water of combination is driven out at the higher temperatures while at the lower temperatures part of the water is retained, thus giving the product a different refractive index and a slightly grayer appearance. For illustration, in the manufacture of Keene's cement and paper filler the acid treated material may be calcined at a temperature of approximately 1500° F., either after first drying out the acid treated material and calcining in dry form or by calcining directly in the form of sludge or slurry.

For making a plaster of either hard wall or white grades, the raw rock can be acid treated and then calcined at a temperature of approximately 300° F. Calcining at the lower temperature will not give the same perfection of color that is obtained from treatment at the higher temperature but will eliminate specks and give the product a distinctly improved color and greater chemical purity.

The material can be calcined in either rotary kilns, stationary kilns, or kettles, but best results are obtained with rotary, or stationary kilns, due to the higher temperatures that are possible with this form of heat treatment and because of possibility of driving off traces of organic matter that may have been acted upon by the sulphuric acid, together with any excess sulphuric acid that may have been left from the treatment when the treatment is effected in a higher temperature kiln.

The method has the additional advantage of enabling production of a neutral product or one of any desired acidity or alkalinity which may be required for specific uses, the sulphuric acid being gradually added to the crushed rock or slurry until the carbonates are neutralized; the supply of acid discontinued at any stage under that required for neutralization to produce a product of desired alkalinity, or the supply continued beyond that required for neutralization to produce a product of desired acidity, limitation of the acid treatment leaving the product incompletely decolorized, but extended treatment having no further effect on the product insofar as coloring is concerned.

What I claim and desire to secure by Letters Patent is:

1. The method of decolorizing natural gypsum material containing a carbonate including reducing the gypsum material to substantially fine size particles, admixing with the particles a quantity of sulphuric acid to neutralize the carbonate content, and calcining said material.

2. The method of decolorizing natural gypsum material containing calcium carbonate including reducing the gypsum material to substantially fine size particles, admixing with the particles a quantity of sulphuric acid sufficient to convert the calcium carbonate to calcium sulphate, and calcining said material.

3. The method of decolorizing natural gypsum material containing a carbonate including reducing the gypsum material to substantially fine size particles, admixing with the particles a quantity of sulphuric acid to neutralize the carbonate content, and calcining said material at a temperature of approximately 1500° F. to produce a dead-burned anhydrous gypsum product.

4. The method of decolorizing natural gypsum material containing calcium carbonate including reducing the gypsum material to substantially fine size particles, admixing with the particles a quantity of sulphuric acid sufficient to convert the calcium carbonate to calcium sulphate, and calcining said material at a temperature of approximately 1500° F. to produce a dead-burned anhydrous gypsum product.

5. The method of decolorizing natural gypsum material containing a carbonate including reducing the gypsum material to substantially fine size particles, admixing with the reduced material sulphuric acid in excess of an amount sufficient to neutralize the carbonate for accelerating the reaction of the acid with the gypsum material, and calcining said material to free the material from any organic matter transformed by the acid and from said excess of acid.

6. The method of decolorizing a natural gypsum material containing calcium carbonate including reducing the gypsum to a substantially fine size, admixing with the reduced material a quantity of sulphuric acid in excess of that sufficient to neutralize and convert the calcium carbonate to calcium sulphate whereby the excess acid accelerates the reaction, and calcining said material to free the material from any organic matter transformed by the acid from said excess of acid.

7. The method of decolorizing natural gypsum material containing calcium carbonate including admixing with the material a sufficient quantity of sulphuric acid to effect conversion of the calcium carbonate to calcium sulphate, and calcining said material to produce a dead-burned anhydrous gypsum product.

8. The method of decolorizing natural gypsum material containing calcium carbonate including admixing with the material a sufficient quantity of sulphuric acid to effect conversion of the calcium carbonate to calcium sulphate, and calcining said material at a temperature of approximately 1500° F. to produce a dead-burned anhydrous gypsum product.

FRANK LEE MARSH.